United States Patent
Tomishima

(10) Patent No.: US 10,705,461 B2
(45) Date of Patent: Jul. 7, 2020

(54) IMAGE FORMING DEVICE AND METHOD

(71) Applicant: HP Printing Korea Co., LTD., Suwon-si (KR)

(72) Inventor: Yuichiro Tomishima, Yokohama (JP)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/262,384

(22) Filed: Jan. 30, 2019

(65) Prior Publication Data

US 2019/0163104 A1    May 30, 2019

Related U.S. Application Data

(63) Continuation of application No. 15/515,250, filed as application No. PCT/KR2015/011292 on Oct. 23, 2015, now Pat. No. 10,234,802.

(30) Foreign Application Priority Data

Oct. 23, 2014  (JP) ................. 2014-216141

(51) Int. Cl.
| | | |
|---|---|---|
| *G03G 15/00* | (2006.01) | |
| *G03G 15/20* | (2006.01) | |
| *H05B 6/40* | (2006.01) | |
| *H05B 6/10* | (2006.01) | |
| *H02M 1/088* | (2006.01) | |

(52) U.S. Cl.
CPC ..... *G03G 15/2053* (2013.01); *G03G 15/2039* (2013.01); *G03G 15/55* (2013.01); *G03G 15/80* (2013.01); *H05B 6/40* (2013.01); *H02M 1/088* (2013.01); *H05B 6/105* (2013.01)

(58) Field of Classification Search
CPC .................................. G03G 15/2053
USPC ...................................... 101/484
See application file for complete search history.

(56) References Cited

U.S. PATENT DOCUMENTS

| | | | |
|---|---|---|---|
| 5,248,866 A | 9/1993 | Tanaka et al. | |
| 6,037,576 A * | 3/2000 | Okabayashi | G03G 15/2003 219/619 |
| 7,113,737 B2 | 9/2006 | Morihara | |
| 7,139,495 B2 * | 11/2006 | Morihara | G03G 15/2039 399/33 |
| 8,364,049 B2 * | 1/2013 | Fukushi | G03G 15/2039 219/619 |
| 8,515,297 B2 | 8/2013 | Ishikawa | |
| 2005/0040159 A1 | 2/2005 | Wasai et al. | |
| 2006/0140691 A1 | 6/2006 | Kim et al. | |

(Continued)

FOREIGN PATENT DOCUMENTS

| | | |
|---|---|---|
| CN | 101957580 | 1/2011 |
| CN | 102193446 | 9/2011 |

(Continued)

*Primary Examiner* — Anthony H Nguyen
(74) *Attorney, Agent, or Firm* — Staas & Halsey LLP

(57) ABSTRACT

An apparatus includes an image former and an induction heating fusing device. The image former forms an image. The induction heating fusing device fuses the image formed by the image former onto paper. Whether the induction heating fusing device has an error is determined by limiting a current applied to a resonance circuit included in the induction heating fusing device to less than a certain level.

20 Claims, 14 Drawing Sheets

(56) References Cited

U.S. PATENT DOCUMENTS

| | | |
|---|---|---|
| 2007/0047983 A1 | 3/2007 | Itoh et al. |
| 2007/0092278 A1 | 4/2007 | Matsuda et al. |
| 2009/0257766 A1 | 10/2009 | Takada |
| 2010/0046978 A1 | 2/2010 | Suzuki et al. |
| 2010/0104297 A1 | 4/2010 | Hata |
| 2010/0119248 A1 | 5/2010 | Ishikawa |
| 2011/0076037 A1 | 3/2011 | Fukushi |
| 2012/0148273 A1 | 6/2012 | Shimura et al. |
| 2012/0152934 A1 | 6/2012 | Kondo |
| 2013/0156447 A1 | 6/2013 | Eiki |
| 2014/0064768 A1* | 3/2014 | Kirikubo ............ G03G 15/2039 399/70 |
| 2014/0199086 A1 | 7/2014 | Odaka |

FOREIGN PATENT DOCUMENTS

| | | |
|---|---|---|
| CN | 102193447 | 9/2011 |
| EP | 0561207 A2 | 9/1993 |
| JP | 3-190082 | 8/1991 |
| JP | 2001235962 | 8/2001 |
| JP | 2002169393 | 6/2002 |
| JP | 2005156980 | 6/2005 |
| JP | 2006184598 | 7/2006 |
| JP | 2007133154 | 5/2007 |
| JP | 2008-53070 | 3/2008 |
| JP | 2008197475 | 8/2008 |
| JP | 2009204773 | 9/2009 |
| JP | 2012133028 | 7/2012 |
| JP | 2012203044 | 10/2012 |
| JP | 2013125116 | 6/2013 |
| JP | 2014-13352 | 1/2014 |
| JP | 2014119653 | 6/2014 |
| JP | 2014124016 | 7/2014 |
| KR | 10-2011-0102220 | 9/2011 |
| KR | 10-2012-0069513 | 6/2012 |
| KR | 10-1393779 | 5/2014 |
| WO | WO-201214404 | 10/2012 |
| WO | WO-2012144004 | 10/2012 |

* cited by examiner

FIG. 3A

POWER CONSUMPTION VALUE-DRIVING FREQUENCY TABLE (101)

| Power (W) | DRIVING FREQUENCY fsw (KHz) |
|---:|---:|
| 1400 | 36.2 |
| 1300 | 38.5 |
| 1200 | 40.2 |
| 1100 | 41.3 |
| 1000 | 42.1 |
| 900 | 43.2 |
| 800 | 43.8 |
| 700 | 44.5 |
| 600 | 45.8 |
| 500 | 47.2 |
| 400 | 50.6 |
| 300 | 55.1 |
| 200 | 64.2 |
| 100 | 86.1 |
| 0 | 90 |

FIG. 8

CURRENT PHASE-DRIVING FREQUENCY TABLE (102)

| PHASE (°) | RIVING FREQUENCY fsw (KHz) |
|---|---|
| 90 | 100.00 |
| 85 | 90.00 |
| 80 | 81.52 |
| 75 | 80.23 |
| 70 | 57.04 |
| 65 | 52.35 |
| 60 | 44.99 |
| 55 | 43.21 |
| 60 | 40.22 |
| 45 | 39.26 |
| 40 | 37.86 |
| 35 | 36.72 |
| 30 | 35.83 |
| 25 | 35.18 |
| 20 | 34.52 |
| 15 | 34.08 |
| 10 | 33.78 |
| 5 | 33.42 |
| 0 | 32.68 |

IMAGE FORMING DEVICE AND METHOD

CROSS-REFERENCE TO RELATED APPLICATIONS

This application is a continuation application of U.S. patent application Ser. No. 15/515,250, filed Mar. 29, 2017, which is a U.S. National Stage Application under 35 U.S.C. § 371 of PCT International Application No. PCT/KR2015/011292 filed Oct. 23, 2015, which claims the priority benefit of Japan Patent Application No. 2014-216141, filed on Oct. 23, 2014, in the Japan Patent Office, the disclosures of which are incorporated herein in their entirety by reference.

TECHNICAL FIELD

The present disclosure generally relates to an apparatus and a method for forming an image, and more particularly, to an apparatus and a method for detecting an error.

BACKGROUND ART

Due to the development of technologies, a user may use a variety of electronic devices, and the electronic devices should work normally without an error occurring. However, it may be difficult for a user to check an error of an electronic device as the electronic device is complex.

If the electronic device keeps working abnormally, components of the electronic device may become damaged and the electronic device may break down.

A lifespan of an electronic device may improve by detecting an error of the electronic device at an early stage. In order to detect an error of the electronic device, a component thereof, such as a circuit, may be examined.

When a resonance circuit is used in an electronic device, an error of the resonance circuit may be detected so that dangers arising due to resonance of the resonance circuit are reduced.

An electromagnetic induction fusing device may employ an inverter controlling method to detect an error of the resonance circuit. Characteristics of a resonance circuit may be determined based on System resistance Rs($\Omega$), coil inductance L(H), and capacitor capacitance C(F).

It is effective to drive a resonance circuit in its resonance frequency, but the resonance frequency may vary due to changes of characteristics of each component.

When a driving frequency is lower than a resonance frequency, excess current may flow through a resonance circuit or a circuit electrically connected to the resonance circuit, which may result in damage to the circuits. Therefore, it is common to drive the resonance circuit at a higher frequency than its resonance frequency. However, the resonance frequency itself may rise somehow, and so the resonance circuit may be driven at a lower frequency than its resonance frequency.

Technologies to solve such problems are disclosed in following references:

Japanese Unexamined Patent Application Publication No. 03-190082

Japanese Unexamined Patent Application Publication No. 2008-053070

Japanese Unexamined Patent Application Publication No. 2008-197475

DISCLOSURE

Technical Problem

The above references disclose methods of reducing the risk of excess current flowing into a circuit in a device by driving the device or the circuit in a frequency higher than its resonance frequency.

However, the frequency higher than the resonance frequency may not be guaranteed to be always higher than the resonance frequency since the resonance frequency may vary. Therefore, the risk of excess current flowing into a circuit may still remain. For example, circuit components may become damaged and their characteristics may change, which may allow the excess current to flow into the circuit. For example, when a power source is not consistent, the excess current may flow into the circuit.

According to an example embodiment, an induction heating fusing device may effectively reduce the risk of excess current flowing into a circuit.

Technical Solution

According to an aspect of an example embodiment, there is provided an image forming apparatus, including: an image former that forms an image on printing paper; and an induction heating fusing device that fuses the image onto the printing paper and includes: a resonance circuit including an inductor that is inductively heated by a current to generate fusing heat; a driver circuit that applies a current to the resonance circuit; and a controller configured to drive the driver circuit in an A-mode in which a fusing operation is performed, and to determine whether the apparatus has an error in a B-mode in which a magnitude of the current applied to the resonance circuit by the driver circuit is limited to less than a preset level.

The controller is configured to drive the driver circuit in the A-mode when it is determined in the B-mode that the apparatus does not have an error.

The driver circuit is supplied with power from different power sources respectively in the A-mode and the B-mode.

The driver circuit includes a first driver circuit and a second driver circuit, wherein the first driver circuit is driven in the A-mode, and the second driver circuit is driven in the B-mode.

The driver circuit is alternatively electrically connected to the first driver circuit in the A-mode and the second driver circuit in the B-mode.

The first driver circuit is electrically separated from the second driver circuit, the first driver circuit is electrically open in the B-mode, and the second driver circuit is electrically open in the A-mode.

The controller is configured to determine whether the apparatus has an error based on a power consumption value of at least one of the resonance circuit and the driver circuit.

The driver circuit is driven in the B-mode based on a first frequency and a second frequency, and the power consumption value includes: a first power consumption value that is estimated when the driver circuit is driven at the first frequency; and a second power consumption value that is estimated when the driver circuit is driven at the second frequency.

The controller is configured to determine whether the apparatus has an error based on an inclination measured based on the first frequency, the first power consumption value, the second frequency, and the second power consumption value.

The driver circuit is driven in the A-mode at a driving frequency within a predetermined range, and the first frequency and the second frequency is within the predetermined range.

The controller is configured to determine whether the apparatus has an error based on a phase of a current in the resonance circuit.

The phase of the current in the driver circuit is detected periodically based on a clock of the controller.

The controller is further configured to determine whether the apparatus has an error in the A-mode, and to stop driving the driver circuit in the A-mode when it is determined that the apparatus has an error.

The controller is configured to drive the driver circuit in the B-mode to determine whether the apparatus has an error when the controller stops driving the driver circuit in the A-mode.

A driving frequency of the driver circuit in the A-mode is determined based on a power consumption value of at least one of the resonance circuit and the driver circuit.

A driving frequency of the driver circuit in the A-mode is determined based on a phase of a current in the resonance circuit.

According to an aspect of another example embodiment, there is provided a method performed by an image forming apparatus including: an image former that forms an image on printing paper; and an induction heating fusing device that fuses the image onto the printing paper and includes: a resonance circuit including an inductor that is inductively heated by a current to generate fusing heat; and a driver circuit that applies a current to the resonance circuit, wherein the method includes: determining whether the apparatus has an error in a B-mode in which magnitude of the current applied to the resonance circuit by the driver circuit is limited to less than a preset level; and driving the driver circuit in an A-mode in which a fusing operation is performed when it is determined that the apparatus does not have an error in the B-mode.

The driver circuit includes a first driver circuit and a second driver circuit, wherein the first driver circuit is driven in the A-mode and the second driver circuit is driven in the B-mode.

The determining includes: determining whether the apparatus has an error based on a power consumption value of at least one of the resonance circuit and the driver circuit.

The determining includes: determining whether the apparatus has an error based on a phase of a current in the resonance circuit.

DESCRIPTION OF DRAWINGS

FIG. 3A illustrates an example table regarding a relationship between driving frequencies and power consumption values.

FIG. 8 illustrates an example table showing a relationship between driving frequencies and current phases.

MODE FOR INVENTION

Figure 1A:
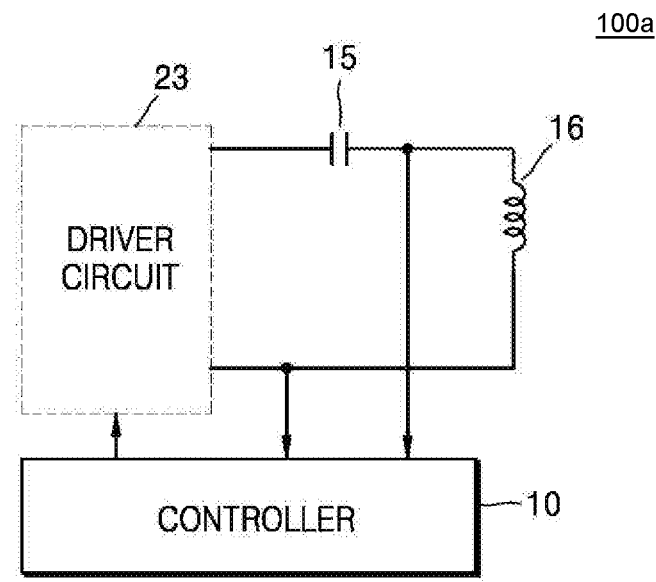
FIG. 1A illustrates an induction heating fusing device according to an example embodiment.

Reference will now be made in detail to embodiments, examples of which are illustrated in the accompanying drawings. In this regard, the present embodiments may have different forms and should not be construed as being limited to the descriptions set forth herein. However, the example embodiments may be realized in different forms, and are not limited to the embodiments in the present disclosure. In the accompanying drawings, like reference numerals refer to like elements throughout.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

As used herein, the singular forms "a", "an", and "the" are intended to include the plural forms as well, unless the context clearly indicates otherwise. It should be understood that the terms "comprises," "comprising," "including," and "having" are inclusive and therefore specify the presence of stated features or components, but do not preclude the presence or addition of one or more other features or components. Numbers described herein are examples for helping understanding, and embodiment should not be limited to the numbers.

In the present disclosure, the term such as " . . . unit" or " . . . module" should be understood as a unit in which at least one function or operation is processed. A component termed as " . . . unit" or " . . . module" may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an example embodiment.

FIG. 1A illustrates an induction heating fusing device according to an example embodiment.

As illustrated in FIG. 1A, an induction heating fusing device 100a includes a resonance circuit, a driver circuit 23, and a controller 10.

The induction heating fusing device 100a may be provided with an image forming apparatus such as a laser printer, and may be used to fuse toner onto paper in the laser printer.

The induction heating fusing device 100a may drive the driver circuit 23 to detect an error of the resonance circuit and/or the driver circuit 23.

The induction heating fusing device 100a may perform a fusing operation based on determining whether the induction heating fusing device 100a or the resonance circuit thereof has an error in a condition where magnitude of a current applied to the resonance circuit by the driver circuit 23 is limited to less than a preset level.

According to the induction heating fusing device 100a, whether the device 100a or the resonance circuit thereof has an error is determined in a condition where magnitude of a current applied to the resonance circuit by the driver circuit 23 is limited to less than a preset level, and damage from an excess current may be reduced.

The resonance circuit of the induction heating fusing device 100a may include an inductor generating a fusing heat by a flow of electricity. For example, as illustrated in FIG. 1A, the resonance circuit may be a serial LC circuit including a capacitor 15 and a coil 16 that are connected in serial, but is not limited thereto.

The resonance circuit may resonate based on its resonance frequency. The resonance frequency may be determined based on inductance and capacitance of the resonance circuit and the driver circuit 23 electronically connected to the resonance circuit.

When characteristics of components of the resonance circuit or the driver circuit 23 change due to damage, aging, or degradation, the resonance frequency may vary.

The driver circuit 23 of the induction heating fusing device 100a may be electronically connected to the resonance circuit, and driven at a driving frequency by the controller 10. A current or voltage of the driving frequency may be applied to the resonance circuit by driving the driver circuit 23. The driver circuit 23 may be connected to a power supply.

When the driver circuit 23 is driven at a frequency lower than the resonance frequency, an excess current may flow into the driver circuit 23 or the resonance circuit connected thereto. As described above, the resonance frequency may vary when characteristics of components of the resonance circuit or the driver circuit 23 change, and thus, the driver circuit 23 may be driven at a driving frequency lower than the resonance frequency.

The controller 10 of the induction heating fusing device 100a may acquire information from a memory, an input port, a current detector, or a voltage detector to perform an operation. The controller 10 may store information in a memory or drive a circuit based on a performed operation. The controller 10 may control a switch of the circuit. Operations may be performed based on a program stored in a memory. The controller 10 may be a micro-controller or a micro computer, but is not limited thereto.

The controller 10 may drive the driver circuit 23. For example, the controller 10 may control a switch of the driver circuit 23.

The controller 10 may drive the driver circuit to apply a voltage to the resonance circuit or let a current flow through the resonance circuit. For example, the controller 10 may apply a voltage of a certain frequency to the resonance circuit or let a current of a certain frequency flow through the resonance circuit by driving the driver circuit 23.

The controller 10 may drive the driver circuit 23 in an A-mode and a B-mode. The A-mode may be referred to as a normal driving mode, and the B-mode may be referred to as a test driving mode. A frequency driving the driver circuit 23 in the A-mode may be referred to as a driving frequency, and a frequency driving the driver circuit 23 in the B-mode may be referred to as a test driving frequency, but roles of the frequencies are not limited by their names herein.

A fusing operation may be performed in the A-mode by the driver circuit 23 and the resonance circuit electrically connected thereto. A magnetic field is generated by a current of a driving frequency flowing through an induction heating (IH) coil of the resonance circuit, and a fusing roller is heated by the magnetic field to fuse toner onto paper.

The controller 10 may determine whether the induction heating fusing device 100a has an error by driving the driver circuit 23 in the B-mode. When it is determined that the induction heating fusing device 100a does not have an error, the controller 10 may drive the driver circuit 23 in the A-mode.

Magnitude of a current flowing through the resonance circuit in the B-mode may be limited to less than a preset level, and thus, magnitude of the current in the B-mode may be smaller than in the A-mode. The driver circuit 23 may be provided with power from different power sources respectively in the A-mode and the B-mode, and thus magnitude of the current flowing through the resonance circuit may be limited to less than a preset level. For example, a voltage between 3 V and 5 V may be applied to the driver circuit 23 in the B-mode, and a voltage between 100 V and 200 V may be applied to the driver circuit 23 in the A-mode.

According to an example embodiment, the magnitude of the current in the B-mode is relatively small, and risk of an excess current may be reduced even while the driver circuit 23 is driven at a frequency lower than the resonance frequency.

The driver circuit 23 may include a first driver circuit and a second driver circuit, which will be described with reference to FIG. 1B.

Figure 1B:
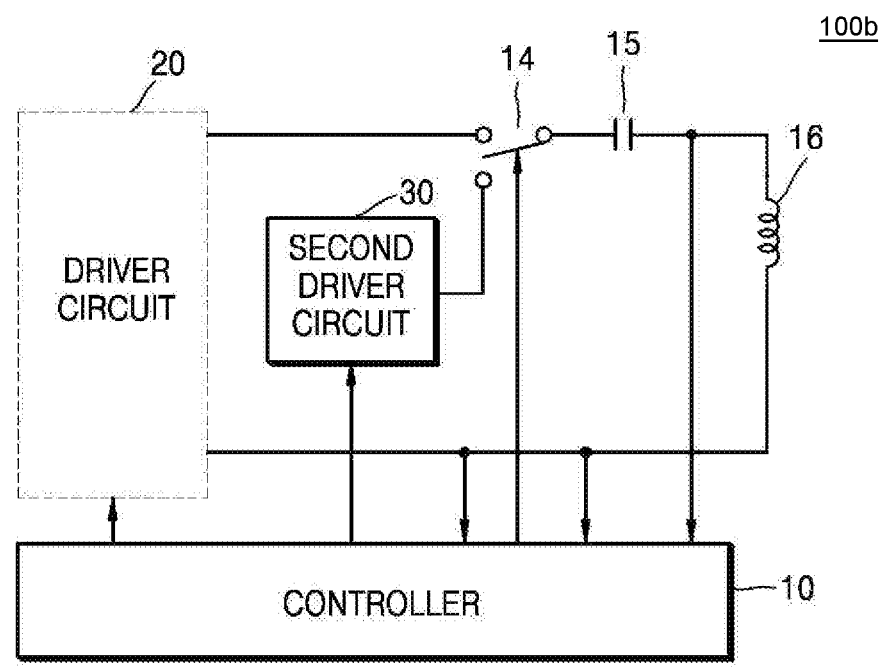
FIG. 1B illustrates an induction heating fusing device including a first driver circuit and a second driver circuit, according to an example embodiment.

FIG. 1B illustrates an induction heating fusing device including a first driver circuit and a second driver circuit, according to an example embodiment.

Referring to FIG. 1B, an induction heating fusing device 100b may include a controller 10, a first driver circuit 20, a second driver circuit 30, a resonance circuit, and a switch 14 electrically connecting the resonance circuit with the first driver circuit 20 or the second driver circuit 30.

According to an example embodiment, the controller 10 may control the switch 14 to electronically connect the resonance circuit alternately with the first driver circuit 20 and the second driver circuit 30.

According to an example embodiment, the first driver circuit 20 may be driven in the A-mode, and the second driver circuit 30 may be driven in the B-mode. The first driver circuit 20 may be referred to as a normal driver circuit, and the second driver circuit 30 may be referred to as a test driver circuit, but the roles of the circuits are not limited by their names.

The controller 10 may drive the second driver circuit in the B-mode and control the switch to electronically connect the resonance circuit with the second driver circuit 30. The controller 10 may determine whether the induction heating fusing device 100b has an error by driving the second driver circuit 30 in the B-mode. When it is determined that the induction heating fusing device 100b does not have an error, the controller 10 may control the switch 14 to electrically connect the resonance circuit with the first driver circuit 20 and drive the first driver circuit in the A-mode.

According to an example embodiment, the risk of damaging the first driver circuit 20 due to an excess current may be reduced by determining whether the induction heating fusing device 100b has an error by the second driver circuit 30 in the B-mode.

According to an example embodiment, the risk of damaging the first driver circuit 20 due to an error in power may be reduced.

Figure 1C:
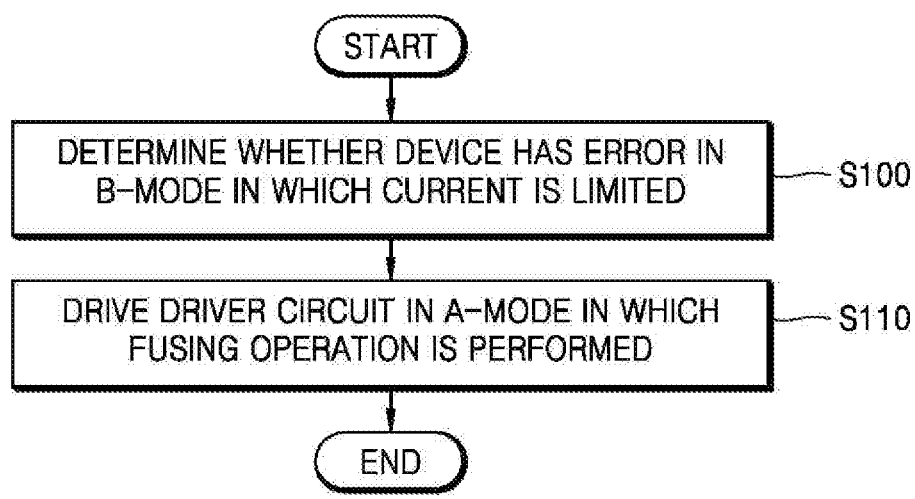
FIG. 1C illustrates a flowchart of a method of detecting an error in an induction heating fusing device, according to an example embodiment.

FIG. 1C illustrates a flowchart of a method of detecting an error in an induction heating fusing device according to an example embodiment.

In operation S100, the induction heating fusing device may determine whether the device has an error in the B-mode in which magnitude of a current applied to a resonance circuit by the driver circuit is limited to less than a preset level.

The driver circuit may be driven by a test driving frequency. The test driving frequency may be higher than a predetermined frequency within a range of driving frequencies of the A-mode. For example, the predetermined frequency within the range of the driving frequencies may be at half, two thirds, three quarters, or four fifths of the range, but is not limited thereto.

According to an example embodiment, whether the induction heating fusing device 100b has an error may be determined by detecting a current or voltage applied to a resonance circuit, or by detecting a current flowing through a coil 16 of the resonance circuit or a voltage between both ends of the coil 16. Example methods of determination of an error are described later with reference to FIGS. 3A, 3B, 8B, and 9.

In operation S110, when it has been determined in operation S100 that the device does not have an error, the induction heating fusing device may drive a driver circuit in the A-mode in which a fusing operation is performed Magnitude of a current flowing through the resonance circuit in the B-mode may be limited to less than a preset level, and thus, magnitude of the current in the B-mode may be smaller than the A-mode. The driver circuit may be provided with power from different power sources respectively in the A-mode and the B-mode, and thus magnitude of the current flowing through the resonance circuit may be limited to less than a preset level. For example, a voltage between 3 V and 5 V may be applied to the driver circuit in the B-mode, and a voltage between 100 V and 200 V may be applied to the driver circuit in the A-mode.

Figure 2:
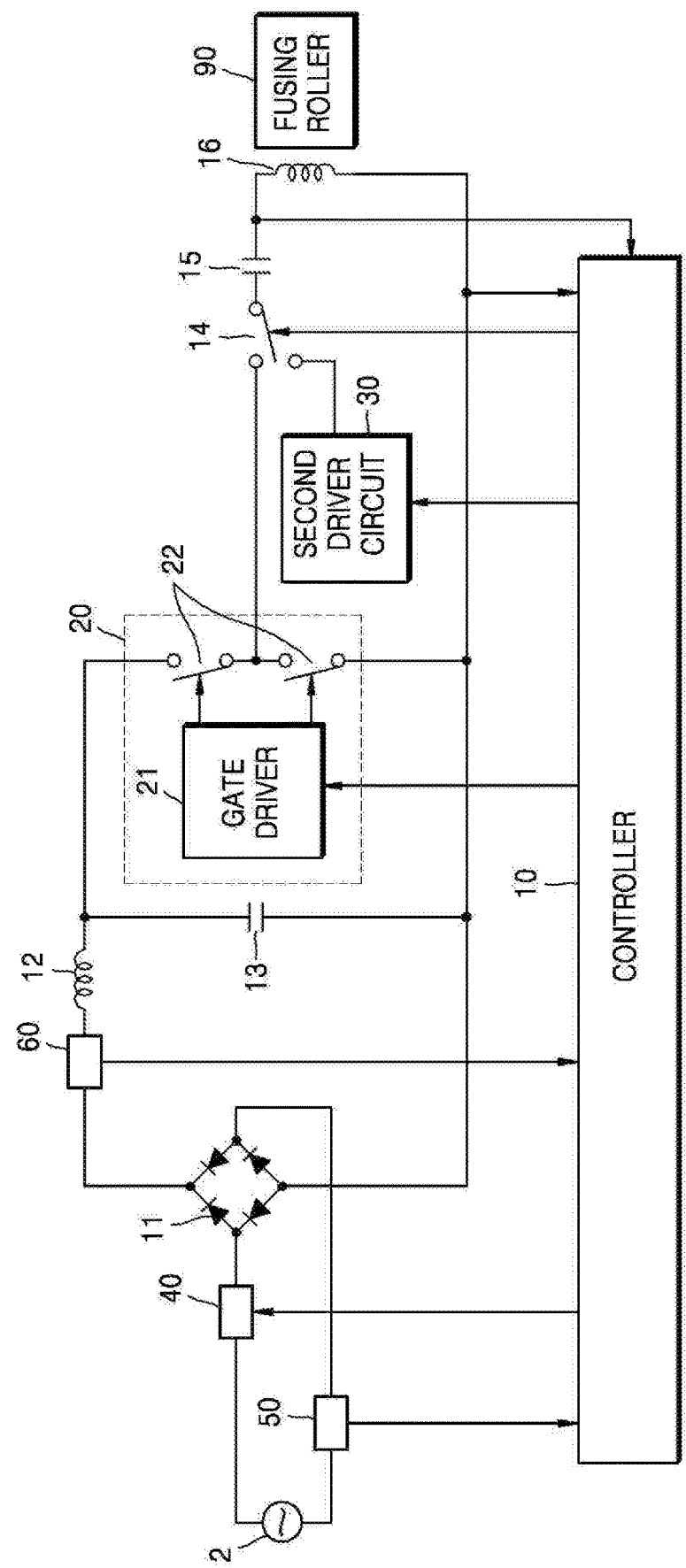
FIG. 2 illustrates an induction heating fusing device according to an example embodiment.

FIG. 2 illustrates an induction heating fusing device according to an example embodiment.

According to an example embodiment, an induction heating fusing device 1 may include a controller 10, a normal driver circuit 20, a test driver circuit 30, a relay circuit controlling power supplied from a power source 2, a current detector 50, a voltage detector 60, a fusing roller 90, a resonance circuit including a capacitor 15 and an IH coil 16, and a switch 14 for switching between the normal driver circuit 20 and the test driver circuit 30. So that rectification, smoothing, and noise filtering of a current from the power source 2 may be carried out, the induction heating fusing device 1 may further include a diode bridge 11, a coil 12, and a capacitor 13.

Both of the normal driver circuit 20 and the test driver circuit 30 may be used for resonance of the resonance circuit including the capacitor 15 and the IH coil 16. The normal driver circuit 20 may be used in the A-mode (normal driving mode) to fuse toner onto paper, and the test driver circuit 30 may be used in the B-mode (test driving mode) to check errors of components of the resonance circuit and the induction heating fusing device 1.

The normal driver circuit 20 may include a gate driver integrated circuit (IC) 21 and a switching component 22 which may be an insulated gate bipolar mode transistor. The gate driver IC 21 may switch the switching component 22, and thereby the normal driver circuit 20 may be driven at a driving frequency in the A-mode based on a control instruction from the controller 10 to apply a voltage or current to the resonance circuit.

The normal driver circuit 20 may be provided with a certain amount of power that is, for example, more than 100 W, and a certain voltage of 100-200V may be applied to the normal driver circuit 20 after rectification, smoothing, and noise filtering processes.

The test driver circuit 30 may include an operational amplifier (OP-amp), a capacitor, and a resistor, but is not limited thereto. The test driver circuit 30 may be driven at a test driving frequency in the B-mode based on a control instruction from the controller to apply a voltage or current to the resonance circuit.

The normal driver circuit 20 may be used for a normal driving mode where toner is fused onto paper, and the test driver circuit 30 may be driven at a test driving frequency that is higher than a certain frequency in a range of driving frequencies to determine whether the induction heating fusing device 1 has an error.

The test driver circuit 30 may be provided with power via a different line from the normal driver circuit 20. For example, a voltage between 3V and 5V may be applied to the test driver circuit 30, and a voltage between 100V and 200V may be applied to the normal driver circuit 20. Therefore, a current flowing through the resonance circuit from the test driver circuit 30 in the B-mode may be limited to less than a predetermined level, and thereby magnitude of the current in the B-mode may be smaller than that in the A-mode.

Through the switch 14, the normal driver circuit 20 and the test driver circuit 30 may be alternately connected to the resonance circuit including the capacitor 15 and the IH coil 16. The switch 14 may be switched by receiving a control instruction from the controller 10.

The controller 10 may measure a power consumption value based on a current and a voltage detected by the current detector 50 and the voltage detector 60. A unit including the controller 10, the current detector 50, and the voltage detector 60 may be referred to as a power measurer.

Referring to FIG. 2, the normal driver circuit 20 and the test driver circuit 30 are provided with power from different lines, and a power consumption value may be measured respectively in the A-mode and the B-mode.

Referring to FIG. 2, a power consumption value in the A-mode may be measured by detecting a current from a line connected to the power source 2 and a voltage from a power supply line connected to the resonance circuit.

The controller 10 may determine whether the induction heating fusing device 1 has an error based on the measured power consumption value.

An example method of determining an error is described with reference to FIGS. 3A and 3B.

FIG. 3A illustrates an example table regarding a relationship between driving frequencies and power consumption values.

Figure 3B:
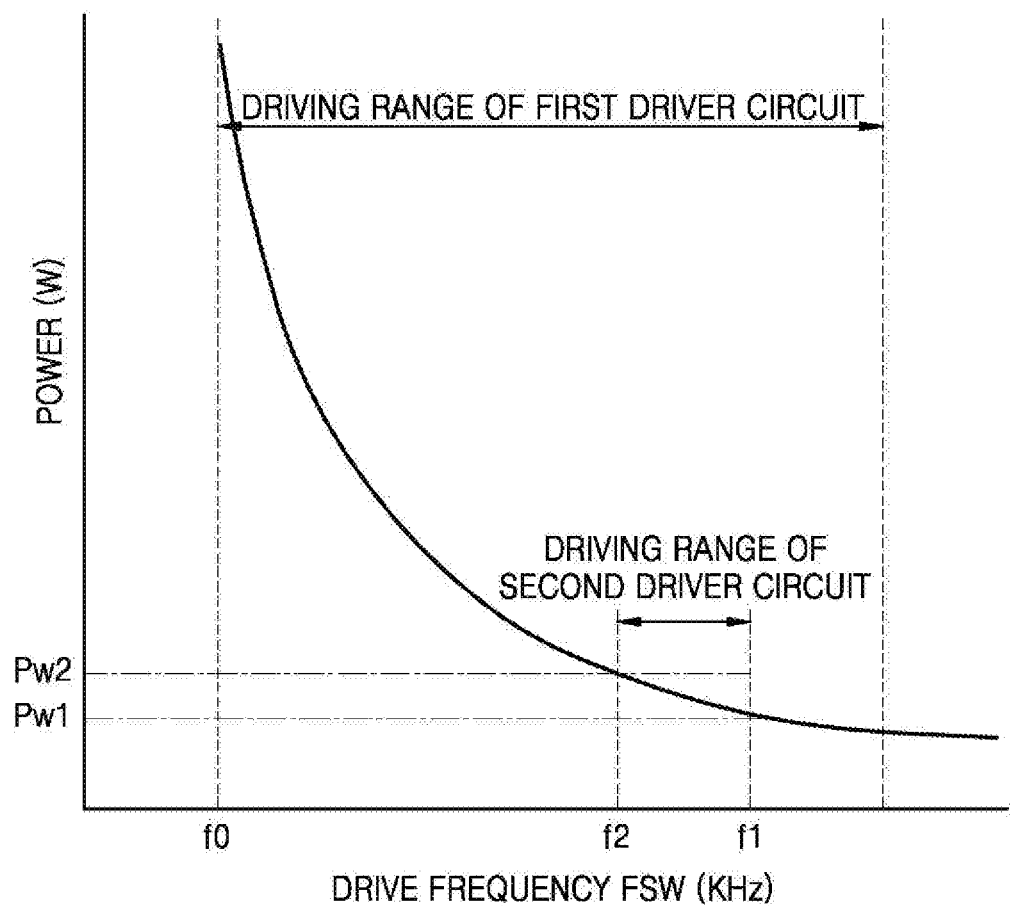
FIG. 3B illustrates a graph regarding a relationship between driving frequencies and power consumption values.

FIG. 3B illustrates an example graph regarding a relationship between driving frequencies and power consumption values.

To determine whether the induction heating fusing device 1 has an error, the controller 10 may refer to a table 101 regarding a relationship between power and driving frequencies as illustrated in FIG. 3A.

The table 101 may store information regarding expected power consumption values with respect to driving frequencies.

The table 101 may be stored in a memory of the controller 10 or the induction heating fusing device 1.

The controller 10 may determine whether the induction heating fusing device 1 has an error based on a measured power consumption value and the table 101. For example, when the measured power consumption value is 100 W at a test driving frequency of 90 KHz of the B-mode, the controller 10 may determine that the induction heating fusing device 1 has an error. When the measured power consumption value exceeds a predetermined range relative to the expected power at the test driving frequency, it may be determined that the device has an error.

According to an example embodiment, the controller 10 may determine whether the induction heating fusing device 1 has an error based on a plurality of test driving frequencies in the B-mode. For example, expected power consumption values at test driving frequencies of f1 (75 kHz) and f2 (70 kHz) are respectively 120 W and 170 W, and it may be determined that the induction heating fusing device 1 has an error when an inclination between measured power consumption values with respect to the test driving frequencies differs by more than a certain extent from an inclination between the expected power consumption values with respect to the same test driving frequencies. Here, the inclination of the expected power consumption values of 120 W and 170 W with respect to the test driving frequencies of 75 KHz and 70 KHz is −10 where units are omitted.

According to an example embodiment, the table 101 may be generated or set based on a graph regarding a relationship between power consumption values and driving frequencies illustrated in FIG. 3B. Referring to FIG. 3B, the graph may be determined based on design of the induction heating fusing device 1.

A driving range of driving frequencies in the A-mode by the normal driver circuit 20 and a driving range of driving frequencies in the B-mode by the test driver circuit 30 are illustrated in FIG. 3B. According to an example embodiment, the controller 10 may determine whether the induction heating fusing device 1 has an error based on a plurality of test driving frequencies in the B-mode. The plurality of test driving frequencies, such as two test driving frequencies f1 and f2 may be higher than a predetermined driving frequency within the driving range of the driving frequencies in the A-mode. The test driving frequencies f1 and f2 in the B-mode may be within the driving range of the driving frequencies in the A-mode.

In the present disclosure, a resonance frequency f0 is 34.1 KHz, and the test driving frequencies f1 and f2 are respectively 75 KHz and 70 KHz, but are not limited thereto.

According to an example embodiment, whether the induction heating fusing device 1 has an error may be determined based on measured power consumption values.

Figure 4:
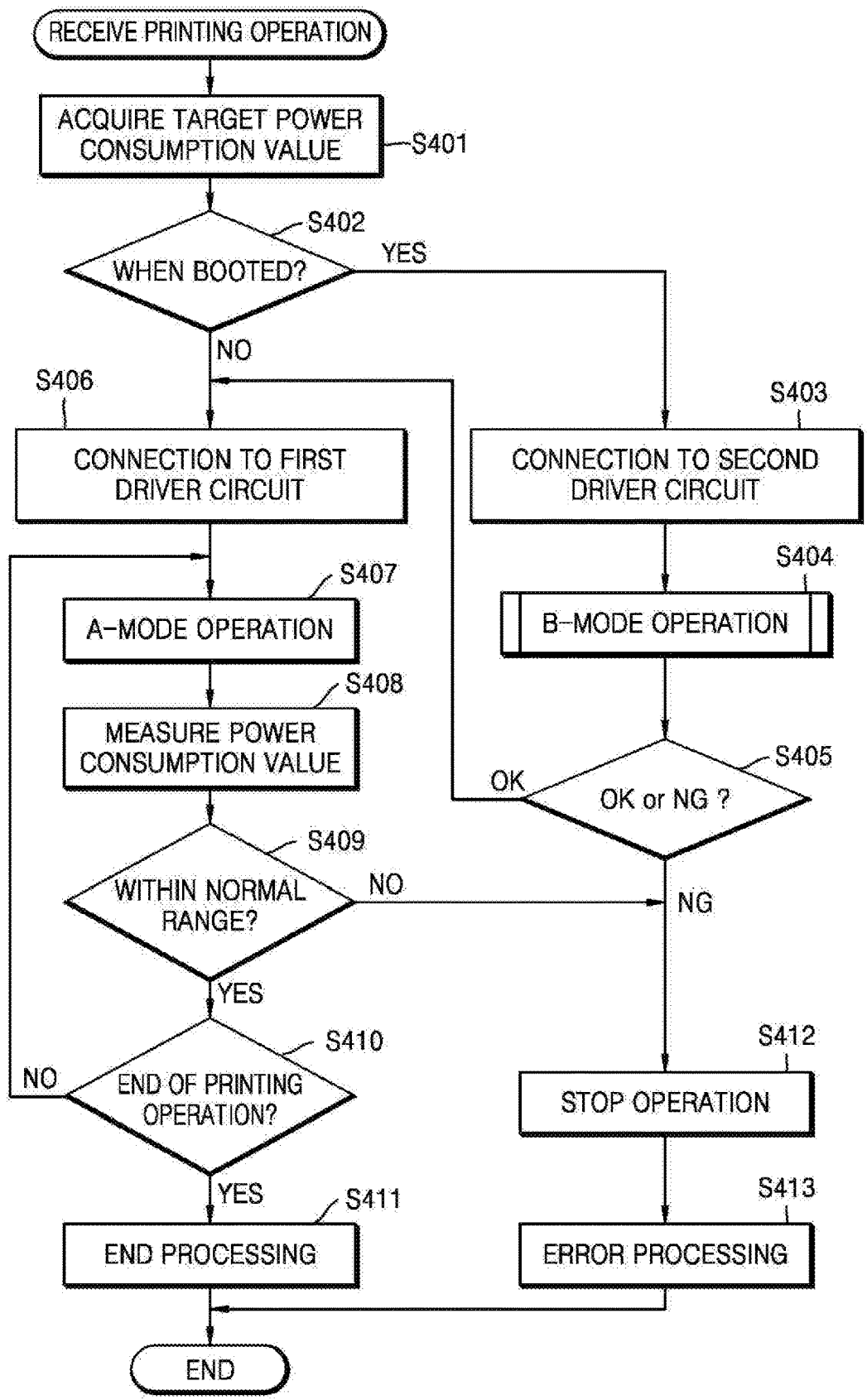
FIG. 4 illustrates a flowchart of a driving process performed in an induction heating fusing device, according to an example embodiment.

FIG. 4 illustrates a flowchart of a driving process performed in an induction heating fusing device according to an example embodiment.

An explanation of the flowchart will be provided with further reference to FIG. 1C. Processes explained below may be performed by the controller 10 of the induction heating fusing device 1.

According to an example embodiment, the induction heating fusing device 1 may be included in an image forming apparatus such as a laser printer and receive a request of a printing operation based on a user input. In operation S401, the induction heating fusing device 1 may acquire a target power consumption value necessary for the printing operation.

Information about the target power consumption value may be included in the request of the printing operation.

In operation S402, the induction heating fusing device 1 may determine whether the induction heating fusing device 1 is in a booting process. The booting process may start when the induction heating fusing device 1 starts booting and end after a predetermined time, or start when the induction heating fusing device 1 starts returning from standby and end after a predetermined time, but is not limited thereto.

The next operation of the method is operation S403 when the induction heating fusing device 1 is in the booting process, or operation S406 when the induction heating fusing device 1 is not in the booting process.

In operation S403, the induction heating fusing device 1 may control the switch 14 to electronically connect the resonance circuit with the test driver circuit 30. When the resonance circuit is connected to the normal driver circuit 20, the induction heating fusing device 1 may electrically separate the resonance circuit from the normal driver circuit 20 and electrically connect the resonance circuit to the test driver circuit 30.

The resonance circuit may be electronically separated from a power line applying a voltage such as one between 100V and 200V from the normal driver circuit 20, and electronically connected to a power line applying a voltage such as one between 3V and 5V from the test driver circuit 30. Because the resonance circuit is electrically separated from the normal driver circuit 20, the risk of an excess current flowing into the switching component 22 of the normal driver circuit 20 may be reduced.

In operation S404, the induction heating fusing device 1 may perform an operation in the B-mode. An explanation of the operation in the B-mode will be provided with reference to FIG. 5.

Figure 5:
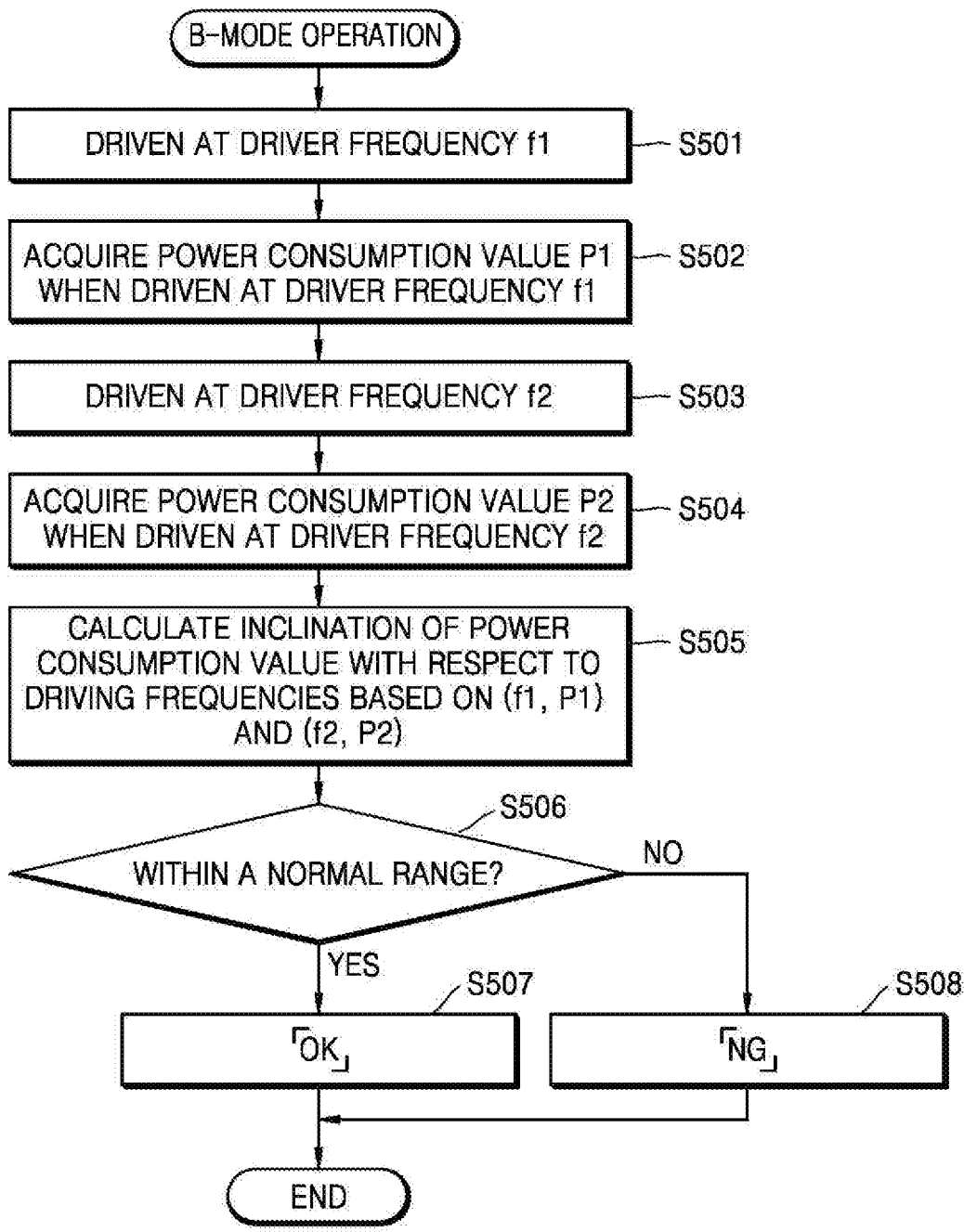
FIG. 5 illustrates a flowchart of a method for detecting an error in an induction heating fusing device of a B-mode, according to an example embodiment.

FIG. 5 illustrates a flowchart of a method for detecting an error in an induction heating fusing device of the B-mode, according to an example embodiment.

In operation S501, the induction heating fusing device 1 may drive the test driver circuit 30 at a test driving frequency f1 (75 KHz).

In operation S502, the induction heating fusing device 1 may acquire a power consumption value P1 according to the test driving frequency f1. The induction heating fusing device 1 may detect a current and a voltage applied to the resonance circuit in the B-mode, or detect a current flowing through the IH coil 16 of the resonance circuit and a voltage between both ends of the IH coil 16.

In operation S503, the induction heating fusing device 1 may drive the test driver circuit 30 at a test driving frequency f2 (70 KHz). In operation S504, the induction heating fusing device 1 may acquire a power consumption value P2 according to the test driving frequency f2. The explanation provided with respect to operations S501 and S502 may be applied to operations S503 and S504, and thus redundant explanations are omitted.

In operation S505, the induction heating fusing device 1 may calculate an inclination between power consumption values with respect to driving frequencies based on the measured power consumption values P1 and P2 and the driving frequencies f1 and f2.

Power consumption values expected from two driving frequencies f1 (75 KHz) and f2 (70 KHz) are respectively 120 W and 170 W, and there is an inclination between the expected power consumption values with respect to driving frequencies. For example, the inclination may be −10 where units are omitted.

In operation S506, the induction heating fusing device 1 may determine whether the inclination is within a normal range. The normal range of the inclination may be set by a parameter that is fixed or changeable.

It may be determined that the induction heating fusing device 1 has an error when an inclination between measured power consumption values with respect to test driving frequencies exceeds a predetermined value or range. For example, referring to the graph of FIG. 3B, when the test driving frequencies f1 and f2 are respectively 75 KHz and 70 KHz, corresponding expected power consumption values P1 and P2 are respectively 120 W and 170 W. Here, an inclination between the expected power consumption values P1 and P2 is −10 where units are omitted, and it may be determined that the induction heating fusing device 1 has an error when the inclination between the measured power consumption values with respect to the test driving frequencies f1 and f2 (75 KHz and 70 KHz) is outside of a normal range determined based on the inclination between the expected power consumption values P1 and P2.

As a result of the determination in operation S506, the induction heating fusing device 1 outputs an okay (OK) signal when the inclination between the measured power consumption values is within the normal range, and outputs a no good (NG) signal when the inclination is outside the normal range.

Referring back to FIG. 4, based on a signal output by the induction heating fusing device 1 in operation S405, the next operation of the method is operation S406 when the output signal is an OK signal, or the next operation of the method is operation S412 when the output signal is an NG signal.

In operation S412, the induction heating fusing device 1 may stop driving the test driver circuit 30. Accordingly, an output to an oscillating circuit may be prevented from being sent. An instruction to stop driving the test driver circuit 30 may include at least one from among an instruction for the test driver circuit 30 to stop oscillation, an instruction to open the relay circuit 40, and an instruction to open the switch 14, but is not limited thereto.

In operation 413 where an NG signal is output, the device may perform error processing. For example, an error message may be displayed. In operation S413, when an error occurs, the induction heating fusing device 1 may store information regarding a status of the induction heating fusing device 1 such as test driving frequencies, detected current, detected voltage, or temperature. The information may be used for analysis of errors.

In operation S406 performed after an OK signal is output, the induction heating fusing device 1 may control the switch 14 to electronically connect the resonance circuit with the test driver circuit 20.

In operation S407, the induction heating fusing device 1 may perform an operation in the A-mode.

The normal driver circuit 20 may be driven at a driving frequency that corresponds to the acquired target power consumption value necessary for the printing operation. The driving frequency that corresponds to the acquired target power consumption value may be acquired from the table 101 of FIG. 3A.

According to an example embodiment, the induction heating fusing device 1 may determine whether the induction heating fusing device 1 or the resonance circuit has an error while operating in the A-mode.

In operation S408, the induction heating fusing device 1 may detect a current and a voltage from the current detector 50 and the voltage detector 60 to measure a power consumption value, and determine whether the induction heating fusing device 1 has an error by comparing the measured power consumption value with an expected power consumption value.

When the measured power consumption value is outside a normal range determined based on the expected power consumption value, the next operation of the method is S412 for stopping an output from being sent to an oscillating circuit, and the following operation is S413 for performing error processing. An instruction to stop driving of the normal driver circuit 20 may include at least one from among an instruction for the normal driver circuit 20 to stop oscillation, an instruction to open the relay circuit 40, and an instruction to open the switch 14, but is not limited thereto.

When it is determined that the measured power consumption value of an operation in the A-mode is within the normal range, the induction heating fusing device 1 may determine whether the printing operation has been completed in operation S410. When the printing operation has not been completed, the method moves back to operation S407 to continue the printing operation in the A-mode. When the printing operation has been completed, the method moves onto operation S411 to perform ending processing such as suspension of driving of the normal driver circuit 20 and recording of result data.

According to an example embodiment, the risk of an excess current flowing into the normal driver circuit 20 or the switching component 22 thereof may be reduced because the induction heating fusing device 1 performs test driving in the B-mode when booted.

In general, in order to reduce the risk of an excess current, a driver circuit is driven at a frequency higher than its resonance frequency. However, it is also possible that the driver circuit may be driven at a frequency lower than its resonance frequency due to an error in the induction heating fusing device 1. If the driver circuit is driven by a frequency lower than its resonance frequency, an excess current may flow into the circuit.

According to an example embodiment, an operation in the B-mode (test driving mode) is performed by the test driver circuit 30 when the induction heating fusing device 1 or an image forming apparatus including the device is booted, and an excess current, and thus, the risk of damaging the circuit may be reduced even though a driving frequency is lower than the resonance frequency. The normal driver circuit 20 including the switching component 22 may be open-circuited in the B-mode so as to reduce the risk of an excess current flowing into the normal driver circuit 20.

When characteristics of components of the induction heating fusing device 1 change due to damage, aging, or degradation, an error may occur in the induction heating fusing device 1.

When the power source 2 has an error, an excess current may flow into a circuit. An explanation of an error of a power source will be provided with reference to FIG. 6.

Figure 6:
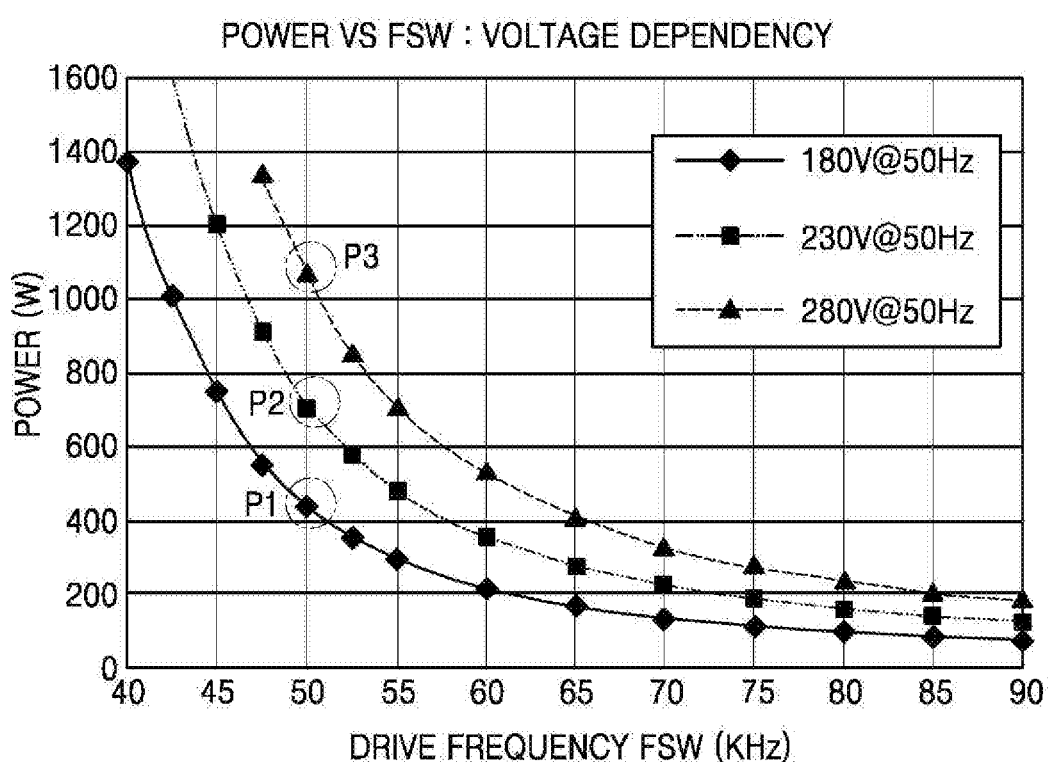
FIG. 6 illustrates an example graph showing a relationship between driving frequencies and power consumption values, according to voltage changes of a power source.

FIG. 6 illustrates an example graph regarding a relationship between driving frequencies and power consumption values, according to voltage changes of a power source.

The graph of FIG. 6 illustrates a case in which a voltage of a power source is changed to 180V, 230V, and 280V. For example, when a driving frequency is 50 KHz and a power source is also changed to 420 W, 710 W, and 1042 W, corresponding expected power consumption values are respectively 420 W, 710 W, and 1042 W. Therefore, the induction heating fusing device 1 may have an error when a power source fails to supply a stable voltage.

According to an example embodiment, a test operation in the B-mode is performed by the test driver circuit 30 while a voltage of a power source varies, and thus, the risk of circuit damage may be reduced.

As described above, an inclination between power consumption values with respect to driving frequencies is acquired in the B-mode, and an error of the induction heating fusing device 1 may be determined based on the acquired inclination. As illustrated in FIG. 3B, a gradient of a power consumption value with respect to a driving frequency becomes greater as the driving frequency approaches a resonance frequency f0. Therefore, when a gradient of a measured power consumption value with respect to a driving frequency is greater than an inclination of a expected power consumption value with respect to the same driving frequency, it may be determined that the induction heating fusing device 1 is in an error state or the induction heating fusing device 1 nears the error state.

A characteristic of a relationship between a power consumption value and a driving frequency may be determined by measuring power consumption values with respect to two driving frequencies f1 and f2 and calculating an inclination of the power consumption values with respect to the two driving frequencies. However, the characteristic of the relationship may be determined by various methods.

For example, the characteristic of the relationship may be determined by measuring power consumption values with respect to a plurality of driving frequencies.

When a measured power consumption value with respect to a test driving frequency exceeds or is outside a range determined based on an expected power consumption value with respect to the same test driving frequency, it may be determined the induction heating fusing device 1 has an error. Furthermore, the controller 10 may determine whether the induction heating fusing device 1 has an error based on the aforementioned method.

According to an example embodiment, an operation in the B-mode may be performed when the induction heating fusing device 1 is booted, regardless of a request of a printing operation.

According to an example embodiment, an operation in the B-mode may be performed as a request of a printing operation is received, regardless of booting of the induction heating fusing device 1. For example, a test operation may be performed in the B-mode when the induction heating fusing device 1 is not in a printing operation, for example, in an idle state.

According to an example embodiment, a state where the test driver circuit 30 is electrically connected to the resonance circuit may be set as a default state of the induction heating fusing device 1. Here, operation S403 in which the test driver circuit 30 is connected to the resonance circuit by the switch 14 when the induction heating fusing device 1 is booted may be omitted. Therefore, stability of the induction heating fusing device 1 may improve.

According to FIG. 5, it is illustrated that the induction heating fusing device 1 includes the normal driver circuit 20 and the test driver circuit 30 to perform the test operation, but the test operation may be performed by switching of a power source line without the test driver circuit 30. For example, the normal driver circuit 20 may be alternately connected to each power line, one of the power lines being for a normal operation in which a voltage between 100V and 200V is applied, and another of the power lines being for the test operation in which a voltage between 3V and 5V is applied. The normal driver circuit 20 may function as the test driver circuit 30 when the normal driver circuit 20 is connected to the power line for the test operation.

In the present disclosure, the normal driver circuit 20 and the test driver circuit 30 are explained as they are separate. However, it should be understood that the normal driver circuit 20 and the test driver circuit 30 physically and separately exist. For example, an integrated chip may employ both of the normal driver circuit 20 and the test driver circuit 30.

Figure 7:
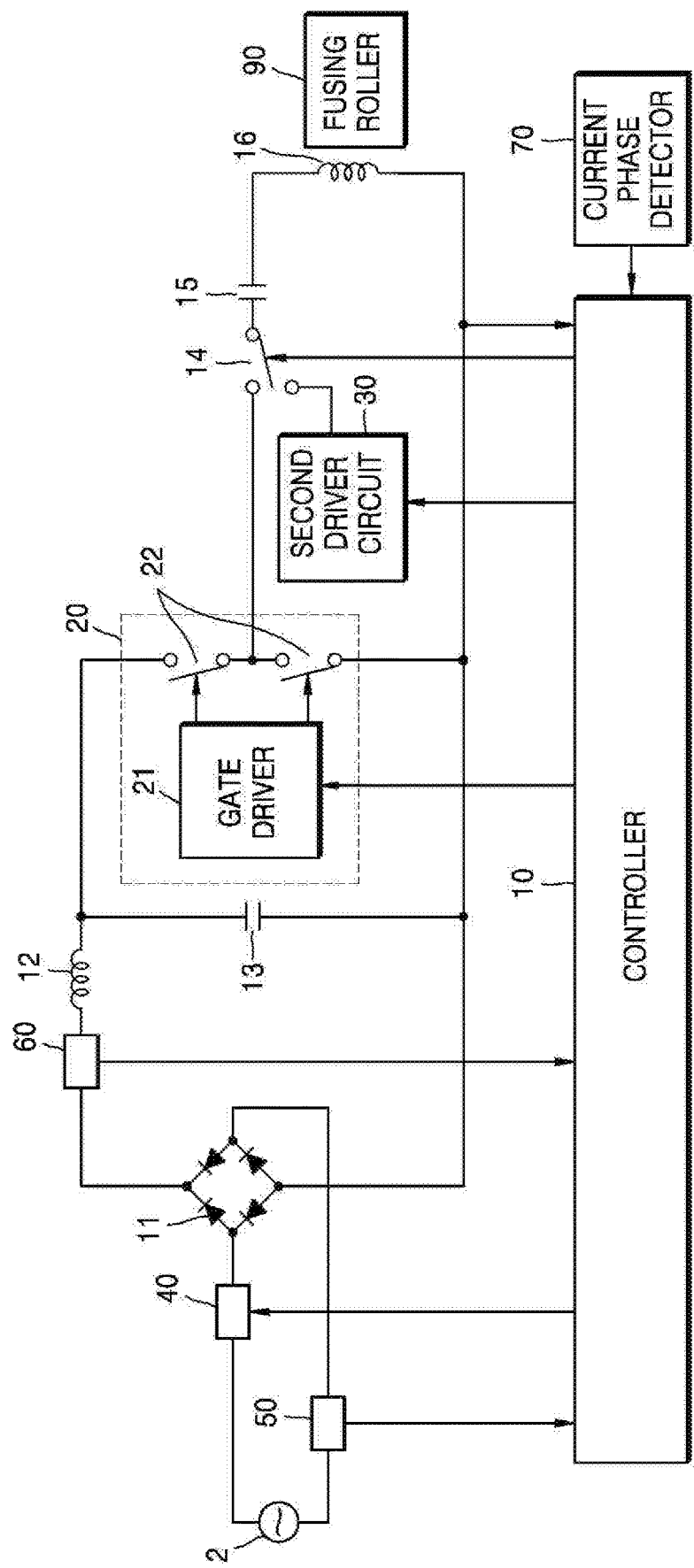
FIG. 7 illustrates an induction heating fusing device according to an example embodiment.

FIG. 7 illustrates an induction heating fusing device according to an example embodiment.

As illustrated in FIG. 7, an induction heating fusing device 1' may further include a current phase detector 70.

The current phase detector 70 may detect a phase of a driving current flowing through the resonance circuit and a phase of a driving voltage. The detected phase of the driving current and a zero-cross phase may be compared with each other so that the current phase detector 70 may acquire a phase difference.

Information regarding the phase of the current may be acquired by a time measuring socket of the controller 10. Information regarding the phase of the current may be periodically acquired by the current phase detector 70 based on a clock frequency of the controller 10.

An example method of determining an error based on a phase of a current shall be described with reference to FIGS. 8 and 9.

FIG. 8 illustrates an example table regarding a relationship between driving frequencies and current phases.

Figure 9:
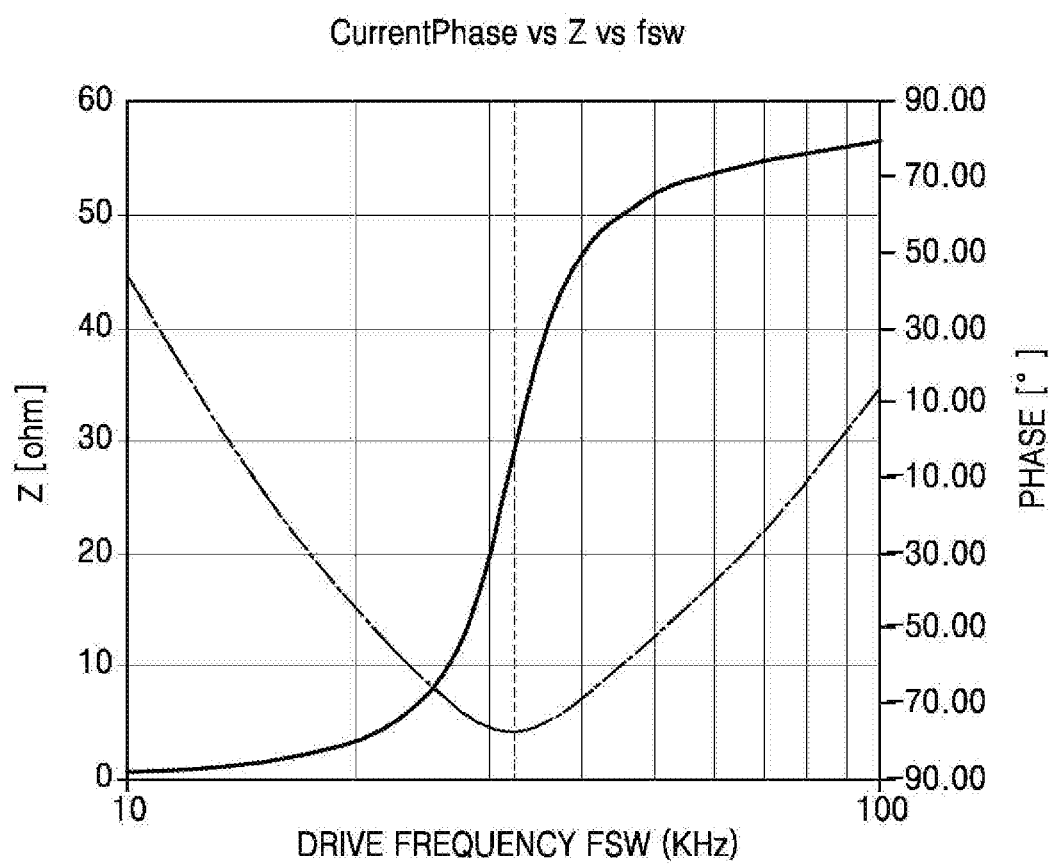
FIG. 9 illustrates an example graph showing a relationship between driving frequencies and current phases.

FIG. 9 illustrates an example graph regarding a relationship between driving frequencies and current phases.

To determine whether the induction heating fusing device 1 has an error, the controller 10 may refer to a table 102 regarding a relationship between current phase values and driving frequencies as illustrated in FIG. 8. The table 101 may store information regarding current phase values with respect to driving frequencies, and may be stored in a memory of the controller 10 or the induction heating fusing device 1'.

The table 102 may be generated, set, or determined based on a graph regarding a relationship between current phase values and driving frequencies illustrated in FIG. 9. Referring to FIG. 9, the graph may be determined based on a design of the induction heating fusing device 1'.

Referring to FIG. 9, the graph illustrates a characteristic of a relationship between driving frequencies and system impedance of a current phase when the induction heating fusing device 1' is booted. For example, a current phase is 0° at a driving frequency of 32.68 KHz which is the resonance frequency.

Figure 10:
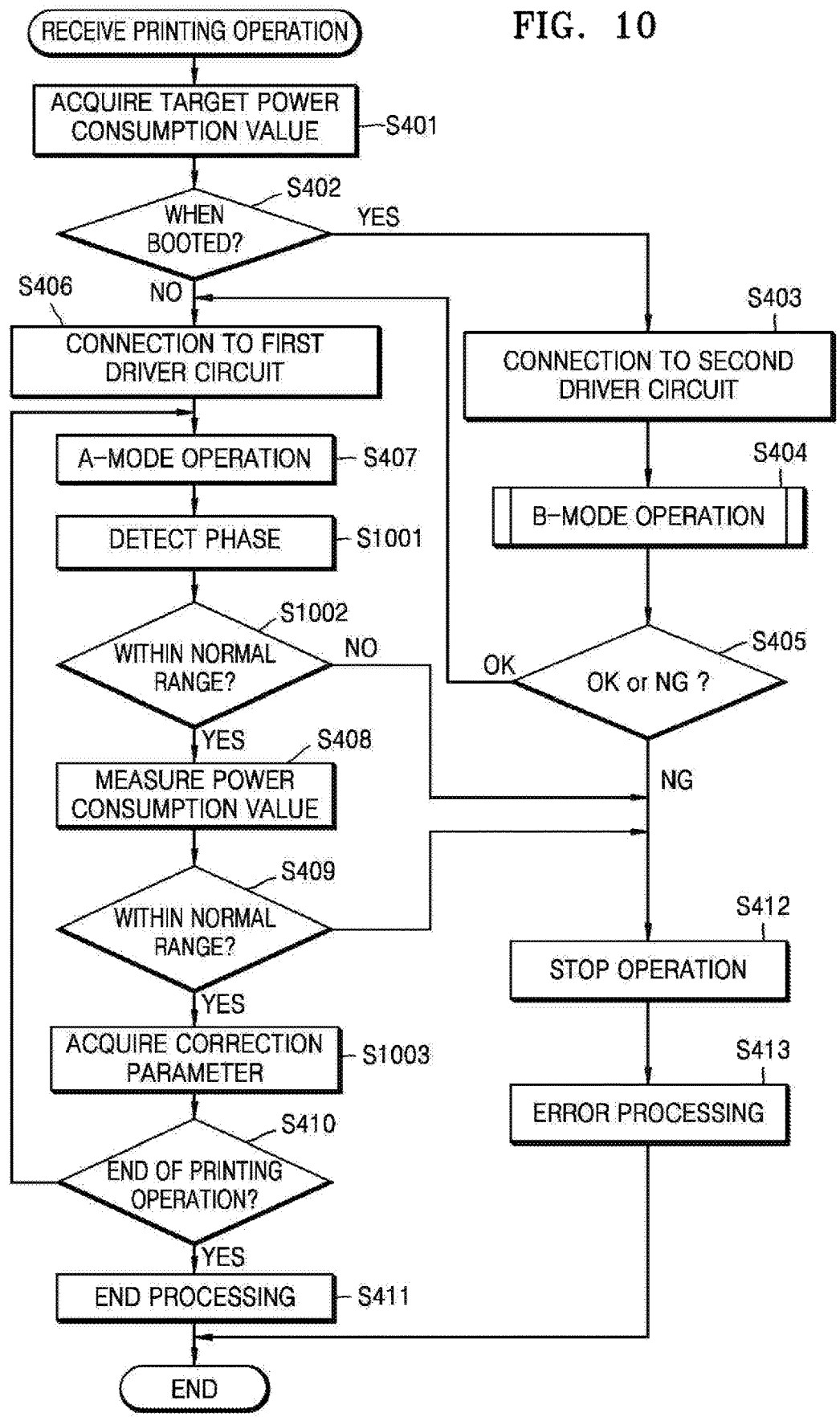
FIG. 10 illustrates a flowchart of a driving process performed in an induction heating fusing device, according to an example embodiment.

FIG. 10 illustrates a flowchart of a driving process performed in an induction heating fusing device, according to an example embodiment.

An explanation of the flowchart shall be provided with further reference to FIG. 7. Processes explained below may be performed by the controller 10 of the induction heating fusing device 1'.

An explanation with respect to the same operations in FIG. 4 is omitted.

According to an example embodiment, the induction heating fusing device 1' may be included in an image forming apparatus such as a laser printer and receive a request of a printing operation based on a user input.

In response to the request of the printing operation, the induction heating fusing device 1' or the image forming apparatus including the device 1' may perform an operation in the B-mode, and proceed to the A-mode when the induction heating fusing device 1' is not in an error state, or perform error processing when the induction heating fusing device 1' is in an error state.

In operation S407, the induction heating fusing device 1' may perform an operation in the A-mode. In operation S1001, the current phase detector 70 may detect a current phase.

In operation S1002, the induction heating fusing device 1' may determine whether the detected current phase is within a normal range.

Standards of determining whether the detected current phase is within the normal range may be set by a parameter that is fixed or changeable. For example, the detected current phase at a driving frequency may be compared with a expected current phase corresponding to the same driving frequency based on the table 102, and it may be determined that the induction heating fusing device 1' has an error when a difference between the detected current phase and the expected current phase exceeds a certain difference such as ±5°. It may be determined that the induction heating fusing device 1' has an error when the detected current phase itself is smaller than a certain value such as 10°. Furthermore, a combination of the above two standards may be considered. Also, it may be determined that the induction heating fusing device 1' has an error when the detected current phase is smaller than the certain value, but even when the detected current phase is greater than the certain value, when the difference between the detected current phase and the expected current phase exceeds the certain difference, it may be determined that the induction heating fusing device 1' has an error.

As a result of the determination in operation S1002, the method proceeds to operation S412 to stop driving and perform the error processing when the induction heating fusing device 1' has an error.

Otherwise, the method proceeds to operations S408 and S409 to measure a power consumption value and determine whether the acquired power consumption value is within a normal range. The method further proceeds to operation S1003 when the acquired power consumption value is within the normal range.

When expected values according to the tables 101 and 102 differ from measured values by more than a certain extent, the induction heating fusing device 1' may acquire a parameter for correction based on the measured values.

In operation S408, a difference between the measured power consumption value and the expected measured values with respect to the same driving frequency may be acquired. For example, when the normal driver circuit 20 is driven at a driving frequency of 44.5 KHz, its expected power consumption value is 700 W according to the table 101. However, when its measured power consumption value is 680 W, a correction corresponding to a difference ΔP between the measured power consumption value and the expected power consumption value, which is 20 W, may be added to the driving frequency of 44.5 KHz. If a target power consumption value is 700 W at the driving frequency of 44.5 KHz, the driving frequency may be corrected to perform an operation at the target power consumption value.

Correction of the driving frequency may be made based on the table 101. For example, a frequency resolution is calculated based on the driving frequency of the target power consumption value, and then, multiplied by the difference ΔP between the target power consumption value and the measured power consumption value at the driving frequency and a frequency correction gain Kp to determine a corrected driving frequency. The frequency correction gain Kp may be determined based on an experiment. The frequency correction gain Kp may be 1.75, but is not limited thereto.

A correction parameter may be determined by multiplying a frequency resolution near the target power consumption value, the difference ΔP, and the frequency correction gain Kp.

For example, when the measured power consumption value is 20 W lower than the target power consumption value of, for example, 700 W at the driving frequency of 44.5 KHz, and a power consumption value near the target power consumption value is 800 W which corresponds to a driving frequency of 43.8 KHz, the frequency resolution near the target power consumption value may be acquired by equation 1.

$$[44.5 \,(KHz) - 43.8 \,(KHz)]/[700 \,(W) - 800 \,(W)] = -0.007 \,(KHz/W) \quad \text{Equation 1}$$

The acquired frequency resolution −0.007 KHz/W may be multiplied by the difference ΔP of 20 W and the frequency correction gain Kp of 1.75 to acquire a correction parameter of −0.25 KHz, and the table 101 may be corrected based on the correction parameter of −0.25 KHz.

When a target power consumption value is 700 W, its corresponding driving frequency is 44.5 KHz. However, the correction parameter of −0.25 KHz may be added to the driving frequency of 44.5 KHz, and so the corrected driving frequency may be 44.25 KHz and be used for driving a circuit in the induction heating fusing device 1'.

The corrected driving frequency may be calculated by Equation 2.

$$\text{The corrected driving frequency} = \{[(Y1-Y2)/(X1-X2)]*\Delta P*Kp\} + Y1 \quad \text{Equation 2}$$

Here, Y1 is a driving frequency, X1 is a power consumption value corresponding to the driving frequency Y1, Y2 and X2 are values approximate to the driving frequency Y1 and the power consumption value X1, ΔP is a difference between a measured power consumption value and an expected power consumption value, and Kp is a correction parameter.

Correction of a driving frequency may be made based on the table 102. For example, referring to FIG. 8, when an expected current phase is 55° at a driving frequency of 43.21 KHz, and a correction parameter is 1.8 KHz, a driver circuit may be driven at a corrected driving frequency of 45.0 KHz that is a sum of the original driving frequency of 43.21 KHz and the correction parameter of 1.8 KHz, and thus, a corresponding current phase is determined as 60°. Whether the induction heating fusing device 1' has an error may be determined based on a difference between the determined current phase of 60° and a measured current phase.

After the correction parameter is calculated in operation S1003, operations in the induction heating fusing device 1' may be performed based on the corrected driving frequency.

In an example embodiment, the correction parameter may be updated while repeating operations S407 through S410, and the driving frequency may be corrected according to the updated correction parameter.

According to an example embodiment, the risk of operating at a lower frequency than a resonance frequency may be reduced by determining stability of the induction heating fusing device 1' in the A-mode based on a difference between a measured current phase and an expected current phase.

As a driving frequency becomes closer to a resonance frequency, a phase difference becomes smaller. Therefore, whether the driving frequency is close to the resonance frequency may be determined based on the phase difference, and thus, the risk of driving a driver circuit at a lower frequency than the resonance frequency may be reduced.

According to an example embodiment, a phase of a current may be detected periodically based on a clock of the controller 10, which may accelerate a test procedure in comparison with signal synchronization based on zero-crossing. Furthermore, when the induction heating fusing device 1' has an error, a stop process may be performed immediately, and thus, the risk of damaging circuits of the device may be reduced.

According to an example embodiment, the induction heating fusing device 1' may operate in a stable condition, even as characteristics of components of the induction heating fusing device 1' change, by calculating and updating a correction parameter frequently.

According to an example embodiment, calculation of the correction parameter (operation S1003) may be performed in the B-mode. For example, a driver circuit is driven at a test driving frequency to calculate a power consumption value at the test driving frequency as in operations S501 through S504, and then, calculation of the correction parameter may be performed.

Accordingly, the correction parameter may be acquired before the induction heating fusing device 1' proceeds to the A-mode, so that operations in the A-mode may be performed by a corrected driving frequency in a stable condition.

According to an example embodiment, determination of an error in the induction heating fusing device 1' based on a current phase may be performed in the B-mode. Furthermore, determination of an error in the induction heating fusing device 1' based on a power consumption value may be performed together.

Referring to FIG. 10, when it is determined by operations S1002 and S409 that the induction heating fusing device 1' has an error, a stop process is performed, but an operation in the B-mode may be performed instead of the stop process.

Figure 11:
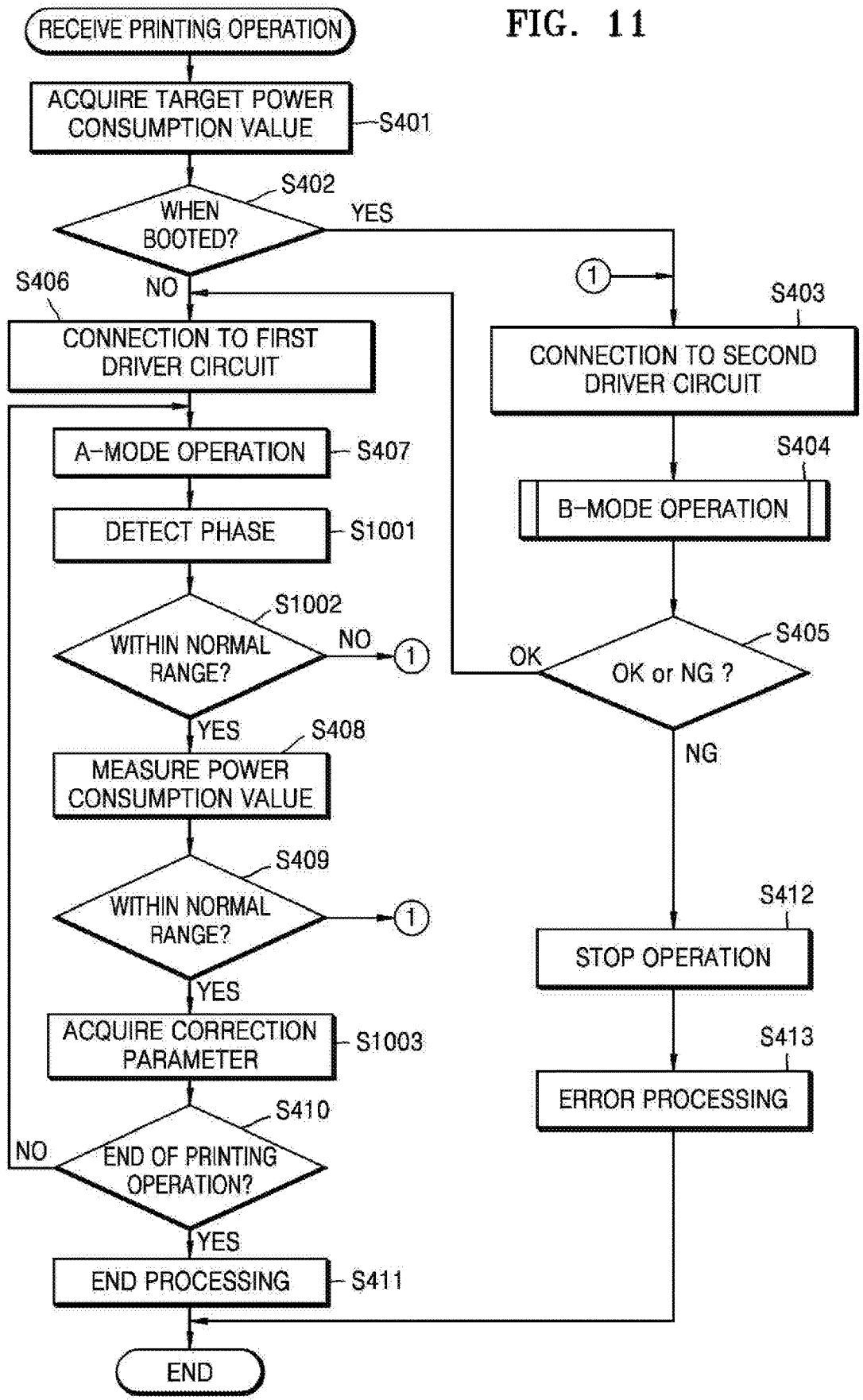
FIG. 11 illustrates a flowchart of a driving process performed in an induction heating fusing device, according to an example embodiment.

FIG. 11 illustrates a flowchart of a driving process performed in an induction heating fusing device, according to an example embodiment.

As illustrated in FIG. 11, when it is determined that the induction heating fusing device 1' has an error, an operation in the B-mode may be performed in the induction heating fusing device 1'. Due to the operation in the B-mode, a printing operation in the A-mode may be paused, and the printing operation in the A-mode may be resumed when it is determined that the device is in a stable or normal condition in the B-mode.

The induction heating fusing device may be provided with an image forming apparatus such as a laser printer, and may be used to fuse toner onto paper in the laser printer.

Figure 12:
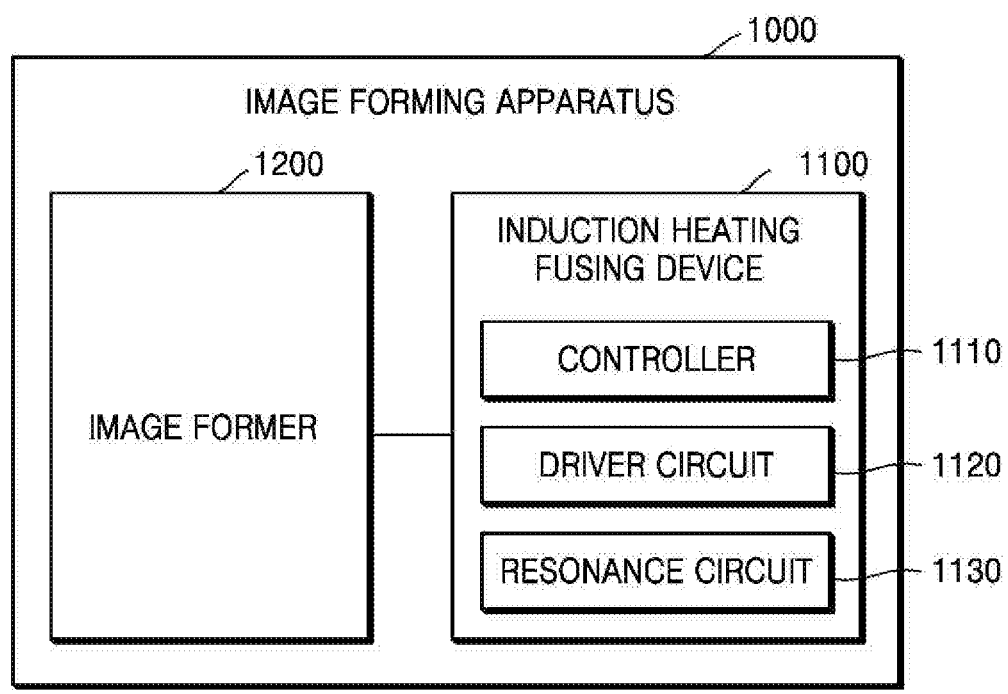
FIG. 12 illustrates an image forming apparatus according to an example embodiment.

FIG. 12 illustrates an image forming apparatus according to an example embodiment.

According to an example embodiment, the image forming apparatus 1000 forms an image by fusing toner onto paper, and may be a laser printer, but is not limited thereto.

The apparatus 1000 may include an induction heating fusing device 1100 and an image former 1200.

The image former 1200 may form an image.

The induction heating fusing device 1100 may fuse the image, formed by the image former 1200, onto paper.

The induction heating fusing device 1100 may include a controller 1110, a driver circuit 1120, and a resonance circuit 1130. The induction heating fusing device 1100 may be the aforementioned induction heating fusing devices 100a, 100b, 1, or 1', but is not limited thereto.

The controller 1110 may correspond to the aforementioned controller 10. The driver circuit 1120 may correspond to the aforementioned driver circuits 23, 20, or 30. The resonance circuit may correspond to the aforementioned resonance circuit including the capacitor 15 and the coil 16.

Explanations of the induction heating fusing devices 100a, 100b, 1, and 1' may be applied to the induction heating fusing device 1000, and thus a redundant explanation is omitted.

According to an example embodiment, the image forming apparatus 1000 may operate in a stable condition due to the aforementioned methods of error determination.

All references including publications, patent applications, and patents, cited herein, are hereby incorporated by reference to the same extent as if each reference were individually and specifically indicated to be incorporated by reference and were set forth in its entirety herein.

Various embodiments of the present disclosure may be embodied as on a computer-readable recording medium including computer-readable codes such as a program module executable at a computer. A computer-readable recording medium may be volatile, non-volatile, or a combination of volatile and non-volatile, where appropriate. The computer-readable recording medium includes a computer storage medium and communication medium. The computer storage medium may include a computer-readable instruction, a data structure, a program module, or any medium, but is not limited thereto. The communication medium may include any information transmission medium such as a carrier wave.

The example embodiments may be represented using functional block components and various operations. Such functional blocks may be realized by any number of hardware and/or software components configured to perform specified functions. For example, the example embodiments may employ various integrated circuit components, e.g., memory, processing elements, logic elements, look-up tables, and the like, which may carry out a variety of functions under control of at least one microprocessor or other control devices. As the elements of the example embodiments are implemented using software programming or software elements, the example embodiments may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the example embodiments concept may employ related techniques for electronics configuration, signal processing, and/or data processing. The terms 'mechanism', 'element', 'means', 'configuration', etc. are used broadly and are not limited to mechanical or physical embodiments. These terms should be understood as including software routines in conjunction with processors, etc.

Embodiments of the present disclosure should be understood as various examples, and should not be interpreted as limitation of embodiments. For the sake of brevity, related electronics, control systems, software development and other functional aspects of the systems may not be described in detail. Furthermore, the lines or connecting elements shown in the appended drawings are intended to represent example functional relationships and/or physical or logical couplings between the various elements. It should be noted that many alternative or additional functional relationships, physical connections or logical connections may be present in a practical device. Moreover, no item or component is essential to the practice of the example embodiments unless it is specifically described as "essential" or "critical."

The use of the terms "a", "an", and "the" and similar referents in the context of describing the example embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The operations of all methods described herein can be performed in an appropriate order unless otherwise indicated herein or otherwise clearly contradicted by context. The example embodiments are not limited by an order in which the operations are described herein. The use of any and all examples, or example language (e.g., "such as") provided herein, is intended merely to clearly describe the example embodiments and does not pose a limitation on the example embodiments unless otherwise claimed. Numerous modifications and adaptations will be readily apparent to those skilled in this art without departing from the spirit and scope of the example embodiments.

The invention claimed is:

1. An image forming apparatus, comprising:
an induction heating fusing device to fuse an image onto a printing paper and including:
a resonance circuit including an inductor to be inductively heated by a current to generate fusing heat;
a driver circuit to apply the current to the resonance circuit; and
a controller to drive the driver circuit in an A-mode in which a fusing operation is performed, and to determine in a B-mode whether the induction heating fusing device has an error in which a magnitude of the current applied to the resonance circuit by the driver circuit is less than a magnitude of a current applied to the resonance circuit in the A-mode.

2. The apparatus of claim 1, wherein
the controller is to drive the driver circuit in the A-mode when determined in the B-mode that the induction heating fusing device does not have an error.

3. The apparatus of claim 1, wherein
the driver circuit is supplied with power from different power sources respectively in the A-mode and the B-mode.

4. The apparatus of claim 1, wherein
the driver circuit includes a first driver circuit and a second driver circuit,
the first driver circuit is driven in the A-mode, and
the second driver circuit is driven in the B-mode.

5. The apparatus of claim 4, wherein
the driver circuit is alternatively electrically connectable to the first driver circuit in the A-mode and the second driver circuit in the B-mode.

6. The apparatus of claim 4, wherein
the first driver circuit is electrically separated from the second driver circuit,
the first driver circuit is electrically open in the B-mode, and
the second driver circuit is electrically open in the A-mode.

7. The apparatus of claim 1, wherein
the controller is to determine whether the induction heating fusing device has an error based on a power consumption value of any one or combination of the resonance circuit or the driver circuit.

8. The apparatus of claim 7, wherein
the driver circuit is driven in the B-mode based on a first frequency and a second frequency, and
the power consumption value includes:
a first power consumption value that is estimated when the driver circuit is driven at the first frequency; and
a second power consumption value that is estimated when the driver circuit is driven at the second frequency.

9. The apparatus of claim 8, wherein
the controller is to determine whether the induction heating fusing device has an error based on an inclination measured based on the first frequency, the first power consumption value, the second frequency, and the second power consumption value.

10. The apparatus of claim 8, wherein
the driver circuit is driven in the A-mode at a driving frequency within a determined range, and
the first frequency and the second frequency is within the determined range so that the magnitude of the current applied to the resonance circuit by the driver circuit in the B-mode is less than the magnitude of the current applied to the resonance circuit by the driver circuit in the A-mode.

11. The apparatus of claim 1, wherein
the controller is to determine whether the induction heating fusing device has an error based on a phase of a current in the resonance circuit, and
the phase of the current in the driver circuit is detected periodically based on a clock of the controller.

12. The apparatus of claim 1, wherein
the controller is to perform any one or combination of,
determine whether the induction heating fusing device has an error in the A-mode,
stop driving the driver circuit in the A-mode when determined that the induction heating fusing device has an error, or
drive the driver circuit in the B-mode to determine whether the induction heating fusing device has an error when the controller stops driving the driver circuit in the A-mode.

13. The apparatus of claim 1, wherein
the driver circuit is driven in the A-mode at a driving frequency within a determined range;
the controller is to determine whether the induction heating fusing device has an error in the A-mode based upon whether a measured power consumption value corresponds to the driving frequency within the determined range; and
the controller is to correct the driving frequency according to a determinable parameter.

14. The apparatus of claim 1, wherein the controller is to in a boot process drive the driver circuit in the B-mode to determine whether the induction heating fusing device has an error.

15. The apparatus of claim 1, wherein
a driving frequency of the driver circuit in the A-mode is determined based on a power consumption value of any one or combination of the resonance circuit or the driver circuit.

16. The apparatus of claim 1, wherein
the controller is to determine a driving frequency of the driver circuit in the A-mode based on a phase of a current in the resonance circuit.

17. An induction heating fusing device to be provided in an image forming apparatus, the device comprising:
a resonance circuit including an inductor to be inductively heated by a current to generate fusing heat;
a driver circuit to apply the current to the resonance circuit; and
a controller to determine in a B-mode whether the device has an error in which a magnitude of the current applied to the resonance circuit by the driver circuit is less than a magnitude of a current to be applied in an A-mode to the resonance circuit in which a fusing operation is performed when determined in the B-mode that the device does not have an error.

18. The induction heating fusing device of claim 17, wherein the driver circuit includes a first driver circuit and a second driver circuit, and
the first driver circuit is driven in the A-mode, and
the second driver circuit is driven in the B-mode.

19. The induction heating fusing device of claim 17, wherein the controller is to determine whether the device has an error based on a power consumption value of any one or combination of the resonance circuit and the driver circuit.

20. The induction heating fusing device of claim 17, wherein the controller is to determine whether the device has an error based on a phase of a current in the resonance circuit.

* * * * *